Dec. 11, 1928.

A. A. CLOKEY 1,695,040

MULTIPLEX TELEGRAPH SYSTEM

Filed July 29, 1926

Inventor:
Allison A. Clokey
by E.W.Griggs Att'y.

Patented Dec. 11, 1928.

1,695,040

UNITED STATES PATENT OFFICE.

ALLISON A. CLOKEY, OF RUTHERFORD, NEW JERSEY, ASSIGNOR TO BELL TELEPHONE LABORATORIES, INCORPORATED, OF NEW YORK, N. Y., A CORPORATION OF NEW YORK.

MULTIPLEX-TELEGRAPH SYSTEM.

Application filed July 29, 1926. Serial No. 125,610.

This invention relates to transmission systems and more particularly to telegraph systems arranged for multiplex operation.

The principal object of the invention is to secure individual leak records of the impulses transmitted or received, for each of the channels in a multiplex telegraph system.

Another object is to produce a leak record of impulses which have been inverted during transmission but which are rectified before recording so as to be directly readable.

A further object is to accomplish two way repeating of messages with a minimum amount of equipment.

It has been the practice heretofore in multiplex telegraph systems to employ rotary distributors arranged to transmit messages over four channels, and, in order to prevent distortion in the received signals with its accompanying zero wander, the polarity of the line battery was reversed at the end of each channel. In this manner, the number of impulses in each channel being the same, the polarities were evenly balanced and no distortion, due to this cause, resulted.

The present invention was conceived during the development of a telegraph system arranged for five channels. In utilizing the standard method of inverting the polarities of the line battery at the end of each channel a predominance of one polarity over the other on the average would occur and thereby cause an exaggerated unbalance of polarities to be imposed upon the line. In order to cut down the probability of heavily unbalanced conditions occurring, the system has been arranged to invert the polarities of marking and spacing batteries between the second and third impulses of each channel signal combination when sent out over the line. In the five channels, each of which is adapted for the transmission of five impulses, the polarities of marking or spacing impulses then become thirteen of one polarity and twelve of the other and if the present means of recording which show these impulses of the five channels in a continuous wave, was used, the record would be difficult to decipher. Therefore, in order to provide a legible record, each of the five channels is provided, with an individual recorder, and as a feature of this invention, these recorders may be arranged to be connected with a third ring associated with either the sending or the receiving rings, or both, of the distributors. The third ring is divided into groups of segments corresponding in number to the channels provided, and to each group is connected a recorder.

Another important feature is the peculiar design of the recorders which may be characterized as being of a differential siphon type. This type of recorder may be described as an ordinary siphon pen operated by a magnetically rotated coil which is positioned between the poles of a permanent magnet and which has connected across its opposite ends a resistance potentiometer having its mid-point connected to ground or otherwise arranged so as to complete the return circuit for the signals.

A more detailed description of the invention follows and is illustrated in the accompanying drawing.

In the drawing there is shown for each of the above mentioned stations only that equipment which is necessary for a description of the invention and to illustrate its adaptability to a complete long line telegraph system in which a submarine cable is employed between the repeater and a distant station.

The rotary distributors shown in the drawing, are adapted for a five channel multiplex system and are arranged to rotate in synchronism in a manner well known in the telegraph art. The preferred arrangement is disclosed in a copending application of A. M. Curtis Serial No. 119,537 filed June 30, 1926 (case 35). Each of these distributors, which for the sake of clearness is shown developed, is equipped with a leak circuit ring provided for the purpose of operating a group of siphon recorders whereby records may be obtained of the impulses transmitted and received.

*Description of the equipment.*

Figure 1:
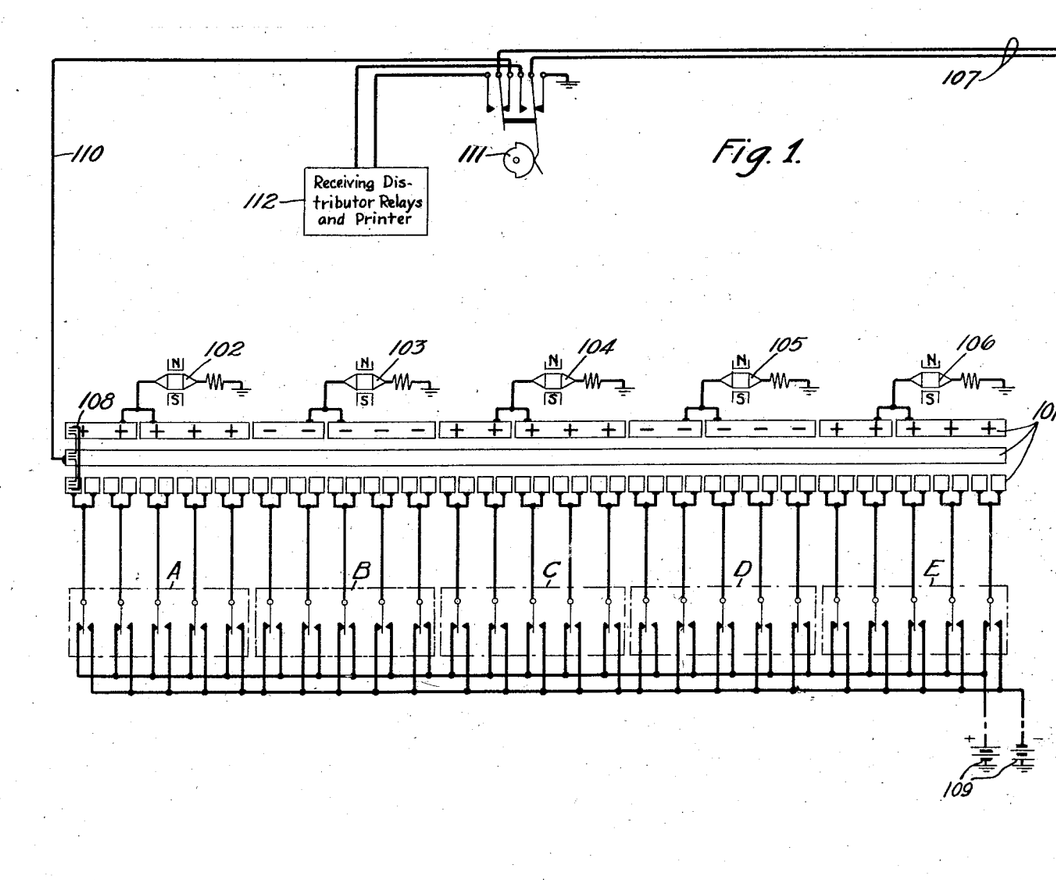
Fig. 1 is a diagrammatic representation of the sending equipment at an inland station, comprising a number of tape transmitters and the sending rings of a rotary distributor, connected over an inland telegraph line to a repeater station.

In Fig. 1 the transmitters A, B, C, D and E are of the tape operated type and are shown connected to the lower segmented ring of the ring group 101 which represents the sending rings of the distributor. This group consists of three rings, namely the lower, middle and upper rings. The lower and the middle rings are respectively the sending and sending common rings proper and the upper ring is the third or sending leak circuit ring which is added for the purpose of providing a connection for each of the associated siphon recorders. The lower ring is divided into fifty equal segments which are strapped together in pairs so that there are in effect only twenty-five segments, five such pairs of segments being reserved for each channel to correspond to the five unit code of the Baudot system. With each group of five such segments there is associated one of the transmitters A, B, C, D and E. The upper or leak ring is shown divided into ten segments of two different lengths, five being of one length and five of the other. The segments of different lengths are connected together in pairs and each pair is connected to one of the siphon recorders 102 to 106 inclusive. The leak ring may be divided into five segments of equal length instead of ten as shown, but it is more desirable to furnish the latter number and then strap them together in pairs in order to provide uniformity in design and construction of distributor rings as will hereinafter be understood from the description of the distributor rings at the repeater and the distant stations. The transmitters A, B, C, D and E are arranged to send out over the line 107 spacing current impulses which reverse in polarity at the end of each channel and accordingly the spacing impulses in the channels for transmitters A, C and E will be of one polarity and those for transmitters B and D will be of the other. The marking impulses, of course, are always of the opposite polarity to that of the spacing impulses. The ring group 101 has common to its three rings brush 108 and as this brush rotates over the segments of the lower rings to send out the line impulses, similar impulses are sent over the upper or leak ring to the recorder of the channel through which the brush happens to be passing at the time. The recorders 102 to 106 are of the well known siphon type which has the electromagnetically operated coil positioned between the poles of a permanent magnet, and register the impulses in the nature in which they are transmitted over the line 107. These coils have a sufficiently high impedance so that the current required for their operation has but a negligible effect on the main signaling current.

Figure 2:
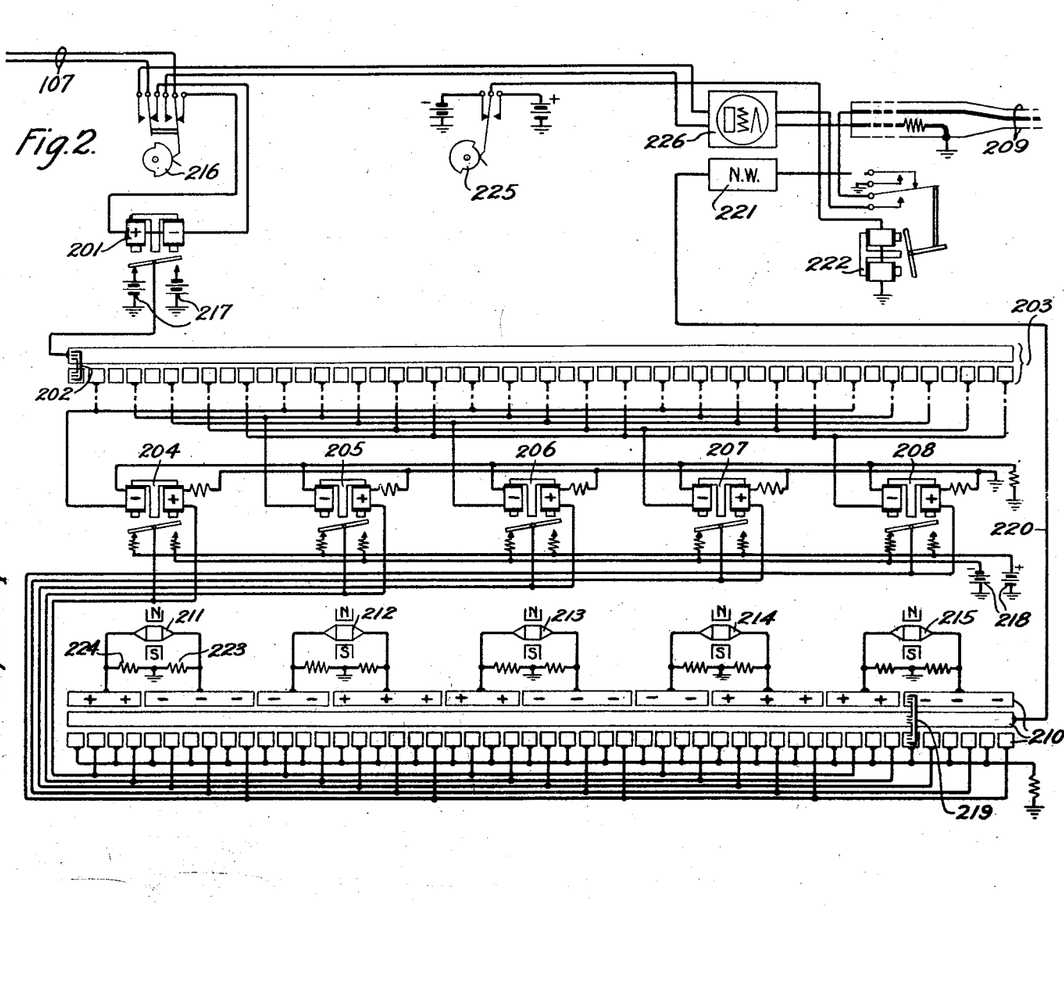
Fig. 2 is a diagrammatic representation of the equipment at the repeater station, comprising a rotary distributor having its receiving and sending rings interconnected by a set of repeater relays, and connected to a distant station over a submarine cable.

In Fig. 2 the line 107 is shown terminating in an unbiased polarized relay 201 which is arranged to operate in response to the incoming signals and as brush 202 rotates over the receiving ring group 203 of the distributor simultaneously with the operation of the relay, impulses of corresponding polarities are generated by the relay to operate the repeater relays 204 to 208 successively. Relay 201 is characterized as unbiased because the armature thereof when once attracted toward either of its associated contacts by current in one direction will remain there whether current remains in the coil windings or not (provided there is no current in the opposite direction). The lower ring of ring group 203 is divided into fifty equal segments arranged in five groups of ten segments each. The alternate segments of each group are respectively connected to the five repeater relays and as these relays are common to the five groups the corresponding alternate segments in each group are connected first in multiple and then to their respectively associated relays. The segments between those alternately connected to the repeater relays are dead and are so provided as to serve as buffers between the circuits which are completed as brush 202 rotates over the segments connected to the relays. Inasmuch as the signals to be transmitted to the distant station are to be sent over a submarine cable 209, the signals incoming at such station would be considerably distorted in a five channel system unless some means is employed to balance as nearly as possible the polarities of these signals before they enter the cable. Should the signals outgoing over the cable consist of alternating positive and negative impulses, the received wave would be, of course, perfectly regular, but, if, on the other hand, the outgoing signals should consist of a combination of two positive impulses followed by a negative impulse in continuous repetition it would be found that shortly after this combination begins to come in at the distant end, the positive wave would grow larger and larger at the expanse of the negative until it reached the maximum bias produced by this combination. If the signals are recorded on a moving tape by a siphon recorder, the zero line of the wave will appear to be shifted over toward the positive side. Where the positive and negative impulses are sent in varying combinations the bias will likewise vary and the zero will appear to wander first toward the positive side and then toward the negative, producing thereby what is generally known as "zero wander". In the case illustrated in the drawing in which the spacing battery in the first, third and fifth channels is of one polarity and that in the second and fourth channels is of the other polarity (see Fig. 1), it is necessary in order to provide a substantially balanced condition for signaling over the cable 209 that the polarities of certain signals of each channel should be inverted, and consequently the system shown has been arranged to invert the polarities of the spacing battery between the second and third impulses of each channel signal combination (see Fig. 2) when sent out over the cable. The marking battery, of course, undergoes similar changes but the polarities are always opposite to those mentioned for the spacing battery. The inversion of the signal polarities between the second and third impulses is effected by reversing the battery connections of the contacts of relays 206, 207 and 208 which are arranged to receive the impulses of the last three impulses of each channel and the impulses regenerated by the repeater relays are then transmitted from the sending ring group 210 over the cable 209 to the distant station. The sending ring group 210 is similar in design and construction to the sending ring group 101 shown in Fig. 1 except for the strapping in pairs of the segments in both the lower and upper rings. In the lower ring of ring group 210 the alternate segments of each channel are connected to the armatures of repeater relays 204 to 208 respectively and like the segments of ring group 203, the corresponding segments of each channel on the lower ring of ring group 210 are connected in multiple to their respectively associated armatures of the repeater relays. The segments between those alternately connected to the relay armatures are grounded for the purpose of rendering the outgoing signals short and sharp to thereby reduce the distortion of the signals received at the distant station. The upper ring, or what is referred to herein as the third ring of ring group 210, is for the leak circuits extending through the siphon recorders 211 to 215 which are shown as individual for each of the five channels. In the third ring of ring group 210 the two segments of each channel are connected to opposite sides of their respective recorder coils and are arranged to receive a portion of the current of the impulses regenerated by the repeater relays, the short segment taking the current of the first two impulses and the long segment that of the last three impulses. The recorders 211 to 215 are of the differential siphon type as hereinbefore referred to and are here required in order that the inverted impulses may be rectified before the current wave of such impulses is recorded. For the sake of describing the operation of these recorders it will be assumed that the five spacing impulses of the first channel will be of positive polarity and these impulses after inversion, become two positive and three negative. The two impulses received on the short segment are therefore positive and those received on the long segment are negative. Recorder 211 which is individually associated with the first channel, has the opposite sides of its coil connected respectively to the short and the long segments and across the coil is shunted a pair of resistances in series having a mid-tap to ground. When the positive current in the first two impulses is received on the short segment it enters the recorder 211 at the left end and divides, part passing through the coil from left to right, thence through resistance 223 to ground; and part direct to ground through resistance 224. When the negative current in the last three impulses is received on the long segment the current flowing from ground divides at the mid-tap of the resistances, part passing through the resistance 224, from left to right through the coil to the sending ring group 210, thence to the negative pole of battery 218; and part through resistance 223, sending ring group 210, to the negative pole of battery 218. In this arrangement the current impulses of each channel, produce the same effect on the rotating coil of the channel recorder for the five impulses as is produced by the first two, and therefore the record of the first channel taken as an example will show the five spacing impulses, provided no marking impulses are sent, as being of positive polarity as actually transmitted from the originating or inland station. Brush 219 is shown following in the rear of brush 202 to indicate the time lag in phase between the receiving and the sending rings, which is required for the energization and operation of relays 204 to 208.

Figure 3:
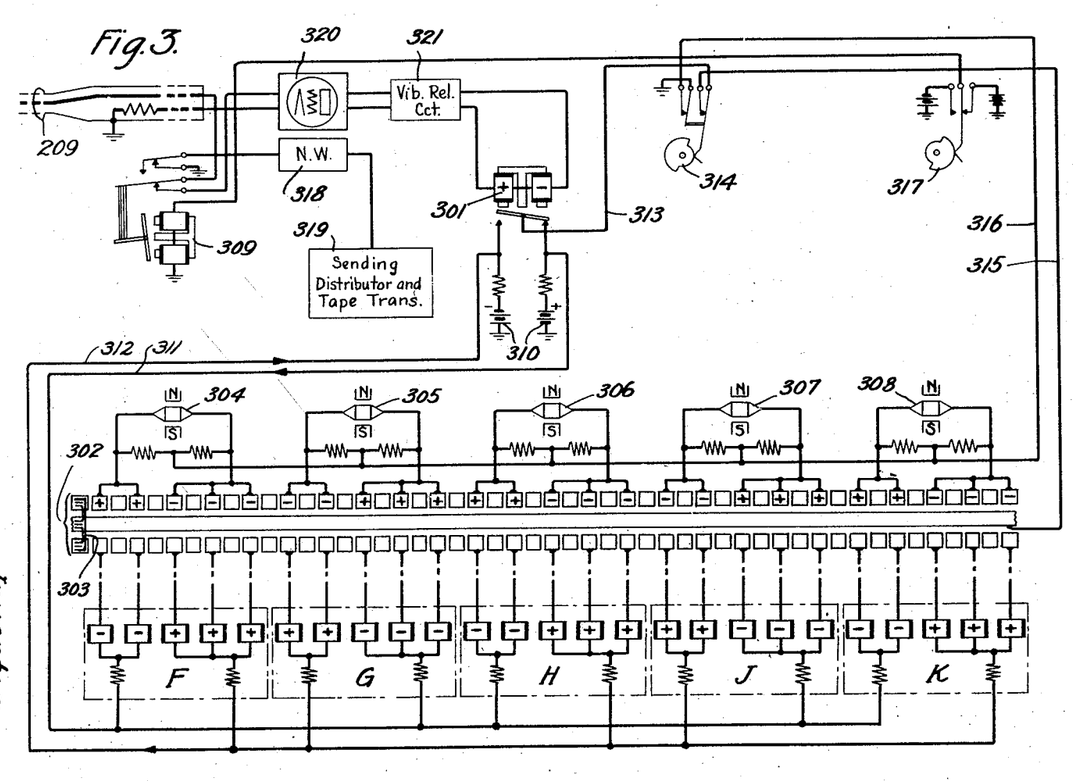
Fig. 3 is a diagrammatic representation of the equipment at the distant station, which comprises the receiving rings of a rotary distributor and the selector magnets of a group of telegraph printers corresponding in number to the transmitters shown in Fig. 1.

In Fig. 3 the submarine cable 209 is shown connected through amplifier 320 to ground. Relay 301, which is of the unbiased polarized type like relay 201, is arranged to operate in response to the signals incoming over the cable and is designed to regenerate impulses corresponding to the impulses received. The regenerated impulses are received on the middle or continuous ring of the receiving ring group 302 and are conducted to two segmented rings by means of a common brush 303. These segmented rings are each divided into fifty equal segments which are arranged in five groups of ten segments each in accordance with the five channels for which the system illustrated is designed. The lower segmented ring has its alternate segments connected to a group of five printers F, G, H, J and K, each printer being individual to one of the five groups or channels. The remaining segments of the lower ring are left unconnected so that only twenty-five of the fifty segments are active. It will be noted that the first five active segments are connected to the five selector magnets respectively of printer F, the second five active segments to those of printer G, and so on for the remaining channels. Each group of active segments is connected to the selector magnets of their respective printers. The upper segmented ring, which is regarded as the third ring of ring group 302, has its alternate segments which are in radial lines with the active segments of the lower ring, connected to a group of siphon recorders 304 to 308 which, like the printers, are individual to each of the five channels. These recorders are similar in design and construction to those shown in Fig. 2. The first two alternate segments in each channel on the upper ring are strapped together and carried to one side of the coil of a recorder and the last three alternate segments are also strapped together and carried to the other side of the coil. The arrangement of the alternate or active segments on the upper ring is practically the same as that of the segments on the upper ring of ring group 210 except that dead segments are provided between the active segments. The dead segments are found necessary because of the tendency of the siphon pen of the recorders at the distant office to insert a slight dip in the record between the second and third impulses of a rectified group of five positive or negative impulses due to the reversal of polarity of the incoming signals which takes place at that point, and this dip seriously interferes with the accurate reading of the signals.

*Detailed description of the operation.*

Inasmuch as the transmitters A, B, C, D and E in Fig. 1 are arranged to reverse the polarities of the impulses at the end of each channel, it is assumed that the impulses of spacing current from transmitters A, C and E are positive and those from the transmitters B and D are negative as will be noted by the positions of the transmitter contacts which are in connection with the battery 109. As the brush 108 rotates over the segments of the lower ring of the sending group 101, a series of circuits is closed successively for each of the transmitters, the circuits for transmitter A being traceable from the positive pole of battery 109, closed contacts at the transmitter, the segments of the lower ring, middle ring, both rings being interconnected by brush 108, conductor 110, left inner contact at cam switch 111, upper conductor of line 107, outer right contact of cam switch 216 at the repeater station, through the winding of relay 201, inner left contact of cam switch 216, lower conductor of line 107, to ground at the outer right contact of switch 111. At the same time part of the current in each of the above circuits is conveyed by brush 108 to the first pair of segments in the upper or third ring to which siphon recorder 102 is connected. Inasmuch as the polarity of the spacing current in the circuits controlled by transmitter A is positive, the coil of recorder 102 will rotate and thereby carry the siphon pen (not shown) to the positive side of the zero line on a moving paper tape (also not shown) and hold it in such position while the brush 108 is passing over the segments of the first channel. But should a message be transmitted during this time, then certain of the normally open contacts at transmitter A will be closed and negative battery connected to the line 107 and the siphon pen will move to the negative side of the zero line for the marking impulses in the circuits closed by the normally open contacts. As brush 108 rotates over the segments in the second channel, the normally closed contacts at transmitter B are connected to the line 107, but the impulses in the circuits thus closed are negative and the siphon pen of recorder 103 will record the impulses accordingly on the negative side of the zero line, unless a message is sent from transmitter B then the marking impulses will be positive. As brush 108 rotates over the segments in the remaining channels, the recorders of each channel will likewise record the spacing and marking impulses as they are actually transmitted from their respective transmitters. Line 107 being of the inland type is a comparatively short line and although the polarities of the spacing impulses in the system shown will be unbalanced to the extent of having 15 positive to 10 negative impulses for each revolution of brush 108, the bias thereby produced in the signals received at the repeater station is negligible and need not be considered.

As the impulses of each channel are received in polarized relay 201, the armature thereof will move to either of its two associated contacts in accordance with the polarity of the incoming impulse. These contacts are connected to the respective poles of battery 217 and in this arrangement impulses corresponding in polarity to those transmitted over line 107 will be retransmitted to the continuous ring of the receiving ring group 203. As the brush 202 rotates over group 203 in synchronism with brush 108, a series of circuits will be completed successively in each of the five channels to operate the repeater relays 204 to 208 in rotation. The circuits thus closed by brush 202 may be traced from either of the poles of battery 217, armature of relay 201, continuous ring of ring group 203, brush 202 and the active segments in the lower ring of ring group 203, through the left-hand winding of the repeater relay which is connected to the active segment over which brush 202 is passing at the time, to ground.

The repeater relays are arranged to generate impulses which are to be transmitted by sending ring group 210 over the submarine cable 209 and therefore it is necessary to invert at this point certain of the impulses of each channel so as to provide a more nearly balanced condition in the polarities of the impulses in order that the signals which are to be received at the distant station will not be unduly distorted on account of bias. In order to accomplish this the battery connections of the contacts of relays 206, 207 and 208 which are arranged to receive the last three impulses of each channel combination are reversed so that should positive impulses be received by these relays, the impulses generated would be negative, and vice versa. The impulses generated by relays 204 and 205 will remain the same as those received from relay 201.

Assuming for the sake of illustration that all the impulses for the five channels incoming over line 107 are of spacing current, then the impulses generated by relay 201 will be positive for the first channel, negative for the second, positive for the third, negative for the fourth and positive for the fifth. As brush 202 rotates over the first channel segments of receiving ring group 203, each of the repeater relays operates in its proper sequence. The first two relays, namely, 204 and 205 will generate positive impulses and the last three relays 206, 207 and 208 will generate negative impulses and the circuits for these impulses are closed over the first channel segments of the lower ring of the sending ring group 210 as brush 219 passes thereover. The circuits closed by brush 219 furnish a path to the distant station and this path may be traced from the continuous ring of sending ring group 210, conductor 220, sending network 221, middle contact of relay 222, cable 209, lower contact of relay 309, amplifier 320 to ground at the cable. The vibrating relay circuit 321 is inductively connected and extends through the winding of relay 301. As brush 202 continues to rotate through the remaining channels, the last three impulses of each channel will reverse their polarity in a manner similar to that described for the first channel.

In order to obtain a record of the signals transmitted to the cable, a part of the current of each impuse of the transmitted signal combination is conducted by brush 219 to the upper or third ring of ring group 210 to which are connected the differential siphon recorders 211 to 215. The third ring of ring group 210 consists of five pairs of segments, each pair representing a channel. The first segment of each pair is arranged to receive the first two impulses and the second segment the last three. In the first channel these impulses will be of positive polarity for the first two and of negative polarity for the last three, and inasmuch as these impulses do not represent the true nature of those sent out from transmitter A, it is desirable at this point to produce a record showing the exact impulses from which the true impulses may be read direct. In order to produce such a record the differential type of recorder was developed whereby the current of the first two impulses is caused to enter one side of an electromagnetically rotated coil positioned between two poles of a permanent magnet and the current of the other three impulses to enter at the opposite side. Connected across the coil is a pair of resistances having a mid-tap to ground. The resistances are such as to permit sufficient current to pass through the coil in order to give a good clear record on the moving paper tape. Recorders 211 to 215 are shown as being individual to each of the five channels. When the positive current of the first two impulses in the first channel is received on the first segment of the upper ring of ring group 210, it enters recorder 211 at the left end and divides, part passing from left to right through the coil, thence through resistance 223 to ground and part direct to ground through resistance 224. When the negative current of the last three impulses is received on the second segment, the current flowing from ground divides at the mid-tap of the resistances, part passing through resistance 224, from left to right through the coil to the sending ring set 210, back to the negative pole of battery 218, and part through resistance 223, sending ring set 210, back to the negative pole of battery 218. It is obvious then that in this arrangement, the negative current for the last three impulses of the first channel produces the same effect on the recorder coil 211 as the positive current for the first two impulses so that the spihon pen (not shown) will be urged to indicate on the moving tape the current for the five impulses as being the same as that of the first two, which in this channel is positive. For the remaining channels similar effects are produced at the respective recorders 212 to 215, and therefore instead of producing a record of the signals as they are transmitted over the cable in an inverted position, the record will show the signals as they are actually sent from the transmitters at the originating station.

The signal combinations transmitted over cable 209 are received and amplified at the distant station and inductively received by the polarized relay 301. This relay has its contact connected to opposite poles of battery 310 and like relay 201 is arranged to generate the impulses corresponding to those received in the relay winding. The printers F, G, H, J and K which are connected to the receiving ring group 302 and are individual to each of the five channels, have their selector magnets arranged to be responsive to marking signals only, therefore the incoming spacing signals will have no effect on the printers. Inasmuch as the marking signals are of the opposite polarity to the spacing signals, the selector magnets will operate in response to those impulses which are of the polarities indicated on the drawing, and it will be noted that the polarities shown are opposite to those of the spacing signals transmitted over the cable. It will also be noted that the selector magnets indicated as being responsive to negative current and those indicated as being responsive to positive current are connected by conductors 311 and 312, respectively, to the corresponding poles of battery 310. The purpose of providing this arrangement is to prevent any possibility of the selector magnets operating in response to a spacing signal. The impulses which are thus generated by the spacing signals are, however, effective to operate the differential siphon recorders 304 to 308 as the brush 303 rotates over the receiving ring group 302. These recorders are operated by circuits extending from either pole of battery 310, armature of relay 301, conductor 313, right contact of cam switch 314, conductor 315, continuous ring of ring group 302, brush 303, active segments of the upper ring in their proper sequence, through the recorder coils, over the common lead 316, to ground at the left contact of cam switch 314. These recorders operate to record the current waves of the signals in their respective channels as they were originally transmitted over the line 107 and not as they were received over cable 209. These recorders are of the same type as those designated 211 to 215, the operation of which has been hereinbefore described and therefore no further description of their operation will be necessary.

The system shown in the drawing is arranged for simplex operation because of a loaded submarine cable being employed. This system provides for transmitting in one direction only at a time, therefore, it is necessary to reverse the direction of transmission at stated intervals in order to handle traffic in both directions. The switching from transmitting to receiving is done automatically and for this purpose a switch comprising a series of timing cams is provided at each station to effect the changeover. In Fig. 1 cam 111 controls the connection of the receiving equipment 112, represented diagrammatically; in Fig. 2, cam 225 controls relay 222 which is arranged to connect the cable 209 with either the amplifier 226 or the receiving equipment or the network 221 of the sending equipment, and cam 216 which is mounted on the same shaft with cam 225, prepares the equipment at the repeater station for either sending or receiving; and in Fig. 3, cam 317 controls relay 309 which is arranged to connect the cable 209 with either the sending network 318 and sending equipment 319 or the amplifier 320 and vibrating relay circuit 321 of the receiving equipment, and cam 314 which is mounted on the same shaft with cam 317, is provided to disconnect the common ground conductor 316 from the differential recorders 304 to 308 during the sending interval from this station. For a detailed description of the switching equipment reference may be had to a copending application of A. M. Curtis, Serial No. 119,537, filed June 30, 1926.

The amplifier 226 is preferably of the vacuum tube type as indicated in the drawing. For the details of a suitable amplifier reference is made to the copending application of A. M. Curtis, Serial No. 119,537 filed June 30, 1926 (Case 35), Fig. 11 and Patent No. 1,624,396, granted to A. M. Curtis on April 12, 1927.

It is seen then in the arrangement described above that an individual leak circuit recorder is provided for each channel and all are connected to the telegraph line by means of a third ring which may be added to either the transmitting or the receiving ring groups of a rotary distributor. The third ring is divided into split segments which correspond in number to the channels employed in the system. Where spacing current of both polarities is employed for a single channel, each segment is ordinarily split into two parts although in some cases it may be desirable to provide more, in which event the parts will be so strapped together as to form two groups. These parts or groups are respectively connected to the opposite ends of a recorder so that the impulses of a combination which are received in the form in which they were originally transmitted, will be received at one terminal of the recorder coil and those which are inverted during transmission will be received at the other terminal. The recorder is so designed that upon receiving impulses which are of positive polarity at one end of the recorder and of negative polarity at the other, the current passing through the coil of the recorder will be in one direction for all spacing impulses and in the opposite direction for all marking impulses. In accordance with the practice of reversing the polarity of the line battery at the end of each channel, the direction of the current for both the spacing and marking impulses is likewise reversed for each recorder.

What is claimed is:

1. A telegraph system for transmission of impulses in a plurality of channels, said impulses being originally prepared in accordance with a readable code and transmitted in accordance with a modified code, comprising a leak recorder of one of said channels having a single operating circuit and including a by-path for permitting the reception by said recorder of the modified impulses in opposite modes, whereby a record is produced in accordance with said readable code.

2. A telegraph system for transmission of impulses in a plurality of channels, said impulses being originally prepared in accordance with a readable code and transmitted in in accordance with a modified code comprising a distributing device having contact segments for one of said channels and a leak recorder connected to said segments having a single operating circuit and including a by-path, said segments being arranged in accordance with the modification of said code, whereby said recorder is operated to produce a readable record.

3. A telegraph system for transmission of impulses in a plurality of channels, said impulses being originally prepared in accordance with a readable code and a group of said impulses being transmitted as prepared and another group being transmitted in accordance with a modified code comprising a distributing device having contact segments for one of said channels and a leak recorder connected to said segments, said recorder having a single operating circuit and including a by-path connected to each end of said operating circuit, and said segments including a segment for passing each of said groups of signals to said operating circuit, whereby a record is produced in accordance with said readable code.

4. A telegraph system for transmission of impulses in a plurality of channels, said impulses being originally prepared in accordance with a readable code and a group of said impulses being transmitted as originally prepared and a second group being transmitted in accordance with the inverse of said code, comprising a transmission line, a distributing device having sets of contact segments for one of said channels, means for inverting said second group of impulses connected to one of said sets of segments, a leak recorder having a single operating circuit and being connected to a second set of said segments, a pair of parallel by-paths associated with said operating circuit, and means on said distributing device for associating said inverting means and said recorder with said line to simultaneously pass said groups of original and inverted impulses to said recorder and said line, said second set of segments including a segment for passing said group of original impulses and a segment for passing said group of inverted impulses to said recorder, whereby one of said groups of impulses is inverted to correspond to the other of said groups so that said recorder is operated to produce a record in accordance with said readable code.

5. In a telegraph system, a transmitting means, an auxiliary receiving device, distributing apparatus, a transmission conductor connected to said distributing apparatus, and means on said distributing apparatus for metallically connecting said transmitting means and said auxiliary receiving device together and to said transmission conductor.

6. In a telegraph system, means for transmitting current impulses, devices for storing and regenerating said impulses, distributing apparatus, an auxiliary receiving device, a transmission conductor connected to said distributing apparatus, and means on said distributing apparatus for metallically connecting said storing and regenerating devices and said auxiliary receiving device together and to said conductor.

7. In a telegraph system, means for transmitting current impulses, distributing apparatus, a transmission conductor connected to said distributing apparatus, receiving devices, auxiliary receiving devices, and means on said distributing apparatus for metallically connecting one of said receiving devices, and one of said auxiliary devices together and to said conductor.

8. In a telegraph system, a transmission conductor, a rotary distributor connected to said conductor, impulse devices and auxiliary impulse devices respectively associated therewith, segmented rings on said distributor connected respectively to said impulse devices and said auxiliary impulse devices, a ring common to said segmented rings, and means on said distributor for metallically connecting one each of said impulse devices and said auxiliary impulse devices together and to said transmission conductor through said common ring.

9. In a telegraph system as set forth in claim 8, in which the metallic connections of the impulse devices and the auxiliary devices to the transmission conductor are established simultaneously.

10. In a telegraph system, a transmission conductor, a rotary distributor connected to said conductor, receiving devices and auxiliary receiving devices respectively associated therewith, a pair of segmented rings on said distributor connected respectively to said receiving and said auxiliary receiving devices, a third ring common to said segmented rings, and means on said distributor for metallically connecting one each of said receiving devices and said auxiliary receiving devices together and to said transmission conductor through said third ring.

11. In a telegraph system, a plurality of channels, means for transmitting in each of said channels combinations of signal impulses of positive and negative polarities, means for reversing the polarities of the signal impulses in each channel, auxiliary recording means individual to each channel, said recording means comprising a single operating circuit for reinverting the signals of reversed polarities and for producing the signal combination as originally transmitted.

12. In a telegraph system, a rotary distributor comprising a single brush, a transmission circuit connected to said distributor, and a plurality of recording devices and auxiliary recording devices connected to said distributor and to said transmission circuit through said distributor, each of said recording devices being connected in parallel with its respectively associated said auxiliary recording device through said brush.

13. In a telegraph system, a transmission conductor over which telegraph impulses are transmitted, terminal impulse apparatus, a rotary distributor comprising a pair of rings and a brush for associating said terminal impulse apparatus with said conductor, a third ring contacting with said brush, and recording equipment connected to said third ring to produce an auxiliary record of the impulses traversing said conductor.

14. In a telegraph system, a rotary distributor, a set of receiving rings having a third ring on said distributor, a brush for interconnecting said rings, an incoming telegraph line over which impulses are received, means for regenerating incoming impulses, impulse recording apparatus connected to one of said rings, and auxiliary impulse recording apparatus connected with said third ring, both of said apparatus being connected in parallel by said brush through said regenerating means to said incoming line.

15. In a telegraph system, a rotary distributor, a set of sending rings having a third ring and a rotating brush common to said rings on said distributor, said third ring being divided into a plurality of split segments, impulse transmitting means, an impulse recorder connected to each of said split segments, a transmission circuit connected to said distributor, and means for inverting certain impulses of a signal combination from said impulse transmitting means for transmission over said circuit, said recorder being arranged to reinvert said inverted impulses and to record the combination as originally prepared.

16. In a telegraph system comprising means for sending combinations of positive and negative current impulses, means at the sending end for regenerating said impulses and reversing certain impulses of each combination as impulses of the opposite polarities, a rotary distributor, a set of receiving rings having a third ring on said distributor, said third ring being divided into a plurality of split segments, an incoming telegraph line over which the combinations of regenerated impulses are received, a polar relay responsive to said regenerated impulses and designed to reproduce said regenerated impulses, a plurality of impulse recorders connected to one of said rings, an auxiliary impulse recorder connected to each of said split segments, and means in said auxiliary recorder for re-reversing the reversed impulses of the reproduced signal combination to facilitate the reading of the impulse records.

17. In a transmission system, a plurality of stations arranged for transmitting and receiving signals, a transmission line interconnecting said stations, a plurality of transmitters at each of said stations for preparing combinations of signal impulses for transmission over said line, means for inverting certain impulses of said combinations for transmission, a rotary distributor comprising sets of sending rings and sets of receiving rings at each of said stations, each of said sets comprising a third ring and a rotating brush therefor, and a plurality of siphon recorders connected to each of said third rings for re-inverting the inverted impulses and producing a record of the signal combinations in their original form.

18. In a transmission system, a plurality of transmitting and receiving stations, a transmission line interconnecting said stations, a plurality of transmitters at each of said stations for preparing combinations of impulses for transmission over said line, means for reversing certain impulses of said combinations for transmission, a rotary distributor comprising sets of sending rings and sets of receiving rings at each of said stations, each of said sets having a third ring, and a plurality of siphon recorders each comprising a magnetically balanced coil and a grounded potentiometer connected across said coil, and recorders being connected to each of said third rings for recording said signal combinations as originally prepared.

19. In a transmission system, a plurality of transmitting and receiving stations, a transmission line interconnecting said stations, a plurality of transmitters at each of said stations for preparing signal combinations of positive and negative impulses for transmission over said line, means for changing certain impulses of said combinations to impulses of the opposite polarities for transmission, a continually rotating distributor comprising sets of sending rings and sets of receiving rings at each of said stations, each of said sets comprising a third ring, and a plurality of siphon recorders connected to said third ring of each of said sets for changing back the changed signals and for recording current waves representing the impulse combinations as originally prepared, each of said recorders comprising a permanent magnet, a coil positioned between the poles of said magnet, and a grounded resistance connected across said coil.

20. In a transmission system, a plurality of transmitting and receiving stations, a submarine cable interconnecting said stations, a plurality of transmitters at each of said stations for preparing combinations of impulses of positive and negative polarities for transmission over said cable, a continually rotating distributor at each of said stations arranged to direct signals over said cable in a plurality of channels, a sending and a receiving ring group arranged at each of said distributors, each group comprising three rings and a brush therefor, means at said transmitting station for changing certain signals of said combinations to signals of the opposite polarities for transmission, and a plurality of differential siphon recorders each comprising a magnet, a coil positioned between the poles of said magnet, and a grounded resistance connected across said coil for changing back said signal combinations to effect a registration of the signals as originally prepared, each of said recorders being individual to one of said channels.

21. In a telegraph system, a terminal station, a relay station, synchronously operated transmitting and receiving apparatus at said terminal stations, means for causing transmission to take place in either direction, a synchronous rotary repeater at said relay station, an electron discharge amplifier at said relay station, and means for rendering said repeater effective only when transmitting in one direction and for rendering said amplifier effective only when transmitting in the opposite direction.

22. In a telegraph system, a terminal station, a relay station, a second terminal station, synchronously operated transmitting and receiving apparatus at said terminal stations, means for causing transmission to take place from either terminal, a rotary repeater at said relay station, means under the control of the apparatus at said first terminal for driving said repeater in synchronism therewith, an electron discharge amplifier at said relay station, and means for rendering said repeater effective only when transmitting from said first terminal and for rendering said amplifier effective only when transmitting from said second terminal.

In witness whereof, I hereunto subscribe my name this 26th day of July A. D., 1926.

ALLISON A. CLOKEY.